Oct. 13, 1936.                S. M. FATLAND                2,057,297

HANDLE FOR CONFECTIONS AND METHOD OF JOINING

Filed Nov. 1, 1935

INVENTOR,
S. M. FATLAND
BY G. Ward Kemp
ATTORNEY

Patented Oct. 13, 1936

2,057,297

UNITED STATES PATENT OFFICE 2,057,297

HANDLE FOR CONFECTIONS AND METHOD OF JOINING

Severt M. Fatland, Bremerton, Wash.

Application November 1, 1935, Serial No. 47,824

8 Claims. (Cl. 99—137)

This invention relates to frozen confections and to methods of preparing the same, and particularly to such confections with flexible handles formed inside the confection and to be withdrawn for holding the confection.

Heretofore forms of confections have been provided with handles formed of unyielding sticks, but such handles prevent the close and economic packing of the goods for transportation and storage, and have also proved dangerous. In some cases children have been injured by such projecting handles, when falling while eating the confections supported by such rigid handles, and such handles may be so forced into the mouth of a child.

The common icecream cone is another form used for dispensing frozen confections; but the cream therefor is ordinarily loosely placed in the large end of a pastry cone, and many persons dislike to eat or otherwise dispose of such pastry cone, which soon becomes stale. Again the ball of icecream is loosely disposed in the larger end of the cone and rapidly melts, and parts frequently drop upon the clothing of the user.

It is therefore an object of this invention to provide a flexible resilient handle to be frozen into cakes of confection, and normally not protruding therefrom, but which may be elongated to provide a handle therefor. The said handle to be preferably formed of a plurality of coils of waxed paper, with the outer coil frozen into the confection, and the inner coils adapted to be drawn out in spiral form, for a handle.

Another object is to provide a base plate upon which the confection may be supported while being eaten and through which the handle may be withdrawn for use.

A further object is to provide a method for manufacturing such confections with such adjustable handle therein.

Figure 1:
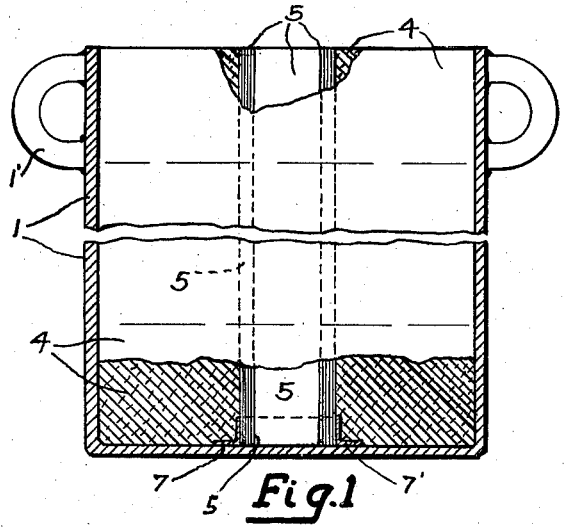
Figure 2:
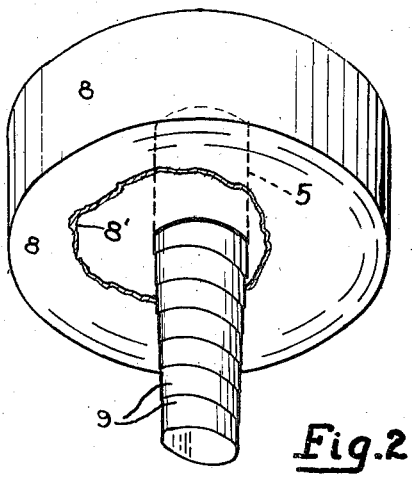
Figure 3:
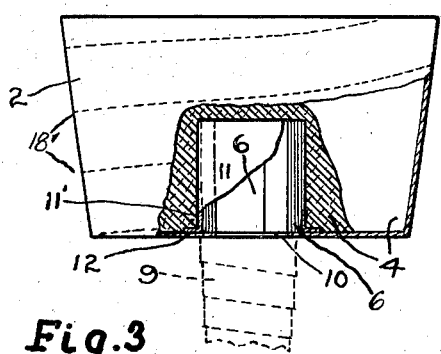
Figure 4:
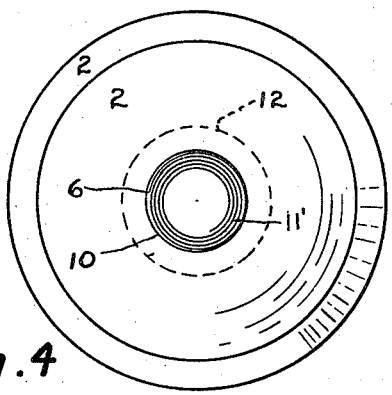
Figure 5:
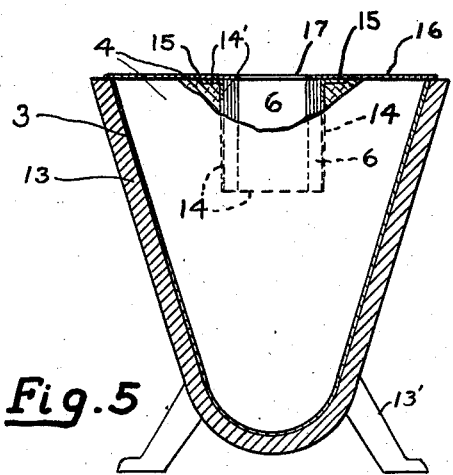
Figure 6:
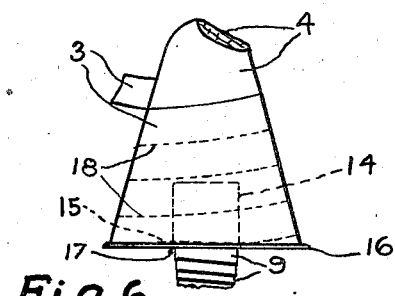

With these and other objects as will hereinafter appear, the invention is illustratively exemplified in the accompanying drawing, of which Figure 1 is a sectional front elevation of a tubular receptacle, of any desired length, filled with a mass of frozen confection, and a tube of rolled paper coils embedded in the confection the length thereof, Figure 2 is a perspective view of a sectional cake of the confection from Figure 1 with a section of the paper coils partly unwound and withdrawn spirally for a handle, Figure 3 is a front elevation of a cup form of receptacle, for frozen confections, with paper coils projected into the confection from the bottom, with a hole in the base of the receptacle through which the coils may be partly withdrawn for a handle, Figure 4 is a bottom view of Figure 3, Figure 5 is a front elevation of a conical mold, with a paper receptacle in section, filled with a frozen confection, with a coiled paper tube inverted into the upper portion thereof, and attached to a plate, Figure 6 is a cone of frozen confection removed from the mold and inverted with the plate for a base and the coils extended beneath such base for a handle.

The three forms of receptacles and forms of cakes or bodies of confections represent some of the preferred adaptations of the extensible paper handles for holding confections.

Like numerals on the different figures represent like parts—

Numerals 1, 2, and 3 represent varying forms of receptacles to be filled with softly frozen confection substance 4. The latter may be icecream, custard, sherbet or other substance that may be prepared for eating when frozen and to be held in the hand, as customary at carnivals, picnics, etc. 5 and 6 represent sheets or strips of waxed paper or other suitable material rolled into tubular coils and so inserted into the semifluid or softly frozen confection substances. The paper is preferably of a resilient and stiff quality with sufficient thickness to provide a supporting handle for holding the confection when partly withdrawn. The inner loose coils are so partially withdrawn in spiral projections 9, as illustrated in Figures 2 and 6.

These paper rolls are either first suitably inserted in the forms of receptacles and the semifrozen confection substance then poured into the receptacle surrounding the sides of the rolls, or the rolls may be inserted into the semifrozen confection. The confection is then subjected to a low freezing temperature, and frozen hard.

The outside layers or coils of the paper rolls are thus frozen to or firmly attached to the adjoining confection, but the interior layers remain loose, and may be easily withdrawn by a finger tip, into the spiral formations shown. They thus provide a convenient handle for holding the confection when it is being eaten. When the coils are positioned into the confection, one end of the coiled tube is adjusted approximately flush with one face of the confection, and the remainder embedded in the confection, thus leaving no materially projecting portion of the handle to prevent a close packing of the separated cakes of confections. But when withdrawn the coils are rigid enough to support the confection, but will still readily yield to prevent injury if fallen upon.

The receptacle 1 is preferably a metal tube, of any desired length with a closed bottom. The paper tube is approximately the same length and the lower open end thereof is covered by the bottom of the receptacle and further sealed with a thin paper fillet band 7, to prevent any of the confection entering into the tube. After the confection has been suitably hardened by freezing, the receptacle is slightly warmed, and the long body of confection is easily removed therefrom and is then cut or otherwise segregated into suitable segments or cakes 8.

The respective coils of the inner paper rolls may be then withdrawn for the handle 9 as shown in Figure 2.

The removal of the frozen confection from the straight walled receptacle is facilitated by a sufficient passage of air through the tube to prevent any vacuum between the bottom of the receptacle and the confection, when the confection and fillet are separated from such bottom.

The receptacle, shown in Figure 3, is preferably a waxed paper cup 2 with a central aperture 10 in its bottom of proper size to permit the paper coils 6 of the tubular roll, to be withdrawn therethrough.

A thin paper cover 11, is preferably wrapped over the paper roll and affixed to outer coils and the lower flange edges 12 of said cover affixed to the inner face of the cup bottom. In this form the coils are normally retained in the confection by said cover 11, which is itself attached by congelation to the confection. When the confection is to be eaten the roll is partially withdrawn for a handle, and the paper cup may be torn off the confection by degrees from the top downward, as eaten.

Figures 5 and 6 illustrate the formation and use of a cone shaped confection, which is molded with its apex downward, and later inverted when eaten. Numeral 3, represents a thin paper conical wrapper, open at the larger end, which may be first conveniently supported in a metal mold 13. The wrapper is then filled with the soft confection 4 and one of the paper coils 6 inserted therein. The coil for this form is covered by and attached to a shield 14, and the edges 15 of the latter affixed to a cover and supporting plate 16. The plate is provided with an aperture 17, from which the paper coil may be partially withdrawn for a handle 9 as shown in Figure 6. When the coil and plate are so positioned the confection is frozen hard in the wrapper and both then removed from the mold.

When eaten, the cone is preferably inverted, and the plate 16 then serves as a support for the base of the conical confection, and aids in preventing any dripping of the confection when melted. The paper wrapper 3 may be gradually removed when the contents are eaten, as indicated in Figure 6. Slight perforations 18 may be provided in the wrapper, to facilitate such removal thereof.

While I have referred to the tubular rolls, as paper coils, I do not limit the same to paper, but other fabrics or materials with suitable flexible characteristics, to permit the coiling thereof for insertion into the confection, and the partial removal thereof in spirals for supporting handles may be used.

Nor do I limit my invention, of such rolls and handles to the specific shapes of the confections illustrated.

A supporting plate similar to that shown on Figures 5 and 6, may also be adapted to the sectional confection portion shown in Fig. 2, and indicated thereon by numeral 8' by broken or torn lines; but in practice the plate may be preferably the same width as that of the confection, and may be either constructed therewith, or slipped upon the handle, after the latter has been withdrawn as shown in said Fig. 2.

Having described my invention, I claim as new:

1. A method of providing a handle for confections, consisting in forming a confection with an opening extending therein, and placing within this opening a coil of flexible material for a handle capable of spiral extension beyond the confection without separation therefrom and attaching the outer coil of said material to said confection.

2. A method of forming segments of a frozen confection with flexible handles therefor, comprising the rolling of a plurality of coils of flexible material into a tube, freezing a covering of confection around and to the outer coil of the tube in elongated form, and dividing the confection and tube into segments for eating, and extending the inner coils of the tube from the segments into spiral stems for handles.

3. A method of providing a number of segments of confection with flexible handles therefor, comprising the rolling into a tube a strip of flexible material, affixing a flange extending at right angles from one end of the tube, placing the flanged end of the tube in a receptacle with the flange adjacent the bottom of receptacle, filling the receptacle around the tube with a soft confection, freezing the confection upon the outer coil of the tube, heating the receptacle to loosen the confection, and admitting air through the tube and beneath the flange, and removing the frozen confection from the receptacle and severing the confection and tube into a plurality of portions, and drawing the inner coils of the tube outward for handles for each separated portion.

4. A frozen confection, with an opening from one face thereof, and a handle comprising a strip of flexible material coiled within said opening and flush with the outside of the confection to facilitate packing thereof with the outer coil of said material secured to said confection, said handle being extensible beyond said opening without separation from the confection.

5. A confection formed with an opening, and a strip of flexible material wholly coiled within said opening for a handle secured within said opening, said handle being spirally extensible beyond and without separation from the confection.

6. A confection formed with an opening, and a spirally wound handle section arranged within the opening with its outer wall attached to the confection.

7. A confection and flexible handle therefor, consisting of a body of frozen confection, a strip of flexible material rolled into a tube with a plurality of coils, said coils provided with an open space in the center to give access for a finger tip for withdrawing the inner coils outward into a spiral roll for a handle, the outer coils of the tube adhesively attached to the confection, for retaining contact with the latter.

8. A confection formed with a plate on the base thereof for supporting the same, the plate provided with an opening centrally therethrough, said confection provided with an opening therein in alignment with the opening in the plate, a coil of flexible material positioned within the opening of the confection, with the outer wall of the coil attached to the confection, and space between the inner coils to permit the entrance of an object for withdrawing the inner coils outward through the openings to provide a handle in spiral form undetached from the confection.

SEVERT M. FATLAND.